United States Patent
Zhao et al.

(10) Patent No.: US 11,468,856 B2
(45) Date of Patent: Oct. 11, 2022

(54) DISPLAY DEVICE INCLUDING SUB LIGHT VALVES SHIELDING SUB-PIXELS IN A RESPONSE PHASE, VIRTUAL REALITY EQUIPMENT, AND DRIVING METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Bin Zhao, Beijing (CN); Lili Chen, Beijing (CN); Hao Zhang, Beijing (CN); Jinghua Miao, Beijing (CN); Yukun Sun, Beijing (CN); Xuefeng Wang, Beijing (CN); Lixin Wang, Beijing (CN); Xi Li, Beijing (CN); Jianwen Suo, Beijing (CN); Ruifeng Qin, Beijing (CN); Ziqiang Guo, Beijing (CN); Guixin Yan, Beijing (CN)

(73) Assignees: BEIJING BOE OPTOELECTRONICS TECHNOLOGY CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 239 days.

(21) Appl. No.: 16/490,784

(22) PCT Filed: Dec. 20, 2018

(86) PCT No.: PCT/CN2018/122392
§ 371 (c)(1),
(2) Date: Sep. 3, 2019

(87) PCT Pub. No.: WO2019/165831
PCT Pub. Date: Sep. 6, 2019

(65) Prior Publication Data
US 2021/0335295 A1    Oct. 28, 2021

(30) Foreign Application Priority Data

Mar. 2, 2018    (CN) .......................... 201810174749.6

(51) Int. Cl.
*G09G 3/36* (2006.01)
*G02F 1/1343* (2006.01)

(52) U.S. Cl.
CPC ......... *G09G 3/3607* (2013.01); *G09G 3/3677* (2013.01); *G09G 3/3696* (2013.01); *G02F 1/13439* (2013.01); *G09G 2310/06* (2013.01)

(58) Field of Classification Search
None
See application file for complete search history.

(56) References Cited

U.S. PATENT DOCUMENTS

| 5,808,797 A | 9/1998 | Bloom et al. | |
| 2012/0287080 A1* | 11/2012 | Akimoto | G02B 26/023 345/212 |

(Continued)

FOREIGN PATENT DOCUMENTS

| CN | 205656369 U | 10/2016 |
| CN | 106154552 A | 11/2016 |
| EP | 2 339 864 A2 | 6/2011 |

OTHER PUBLICATIONS

International Search Report of PCT/CN2018/122392 in Chinese, dated Mar. 22, 2019 with English translation.

(Continued)

*Primary Examiner* — Kirk W Hermann
(74) *Attorney, Agent, or Firm* — Collard & Roe, P.C.

(57) ABSTRACT

A driving method is configured to drive a display device, and the display device includes a display array and a light valve array. The display array includes rows of sub-pixels, the light valve array includes a plurality of sub light valves, a respective one sub light valve of the plurality of sub light (Continued)

valves corresponds to at least one row of sub-pixels, and the light valve array is on a light-emitting side of the display array. The driving method includes: any sub-pixel in the at least one row of sub-pixels being in a response phase of a display operation, the respective one sub light valve being in a light-shielding state, and the respective one sub light valve corresponding to the at least one row of sub-pixels.

16 Claims, 6 Drawing Sheets

(56) References Cited

U.S. PATENT DOCUMENTS

| | | | | |
|---|---|---|---|---|
| 2013/0162614 A1* | 6/2013 | MacNaughton | ....... | G09G 5/003 345/208 |
| 2014/0002509 A1* | 1/2014 | Kim | ..................... | H04N 13/312 345/690 |
| 2014/0043448 A1* | 2/2014 | Lee | ........................ | H04N 13/31 348/51 |
| 2016/0342240 A1* | 11/2016 | Zou | ......................... | G06F 3/041 |
| 2017/0085867 A1* | 3/2017 | Baran | .................. | H04N 13/122 |
| 2018/0047348 A1* | 2/2018 | Yamanaka | ......... | G02F 1/133512 |

OTHER PUBLICATIONS

Notice of Transmittal of the International Search Report of PCT/CN2018/122392 in Chinese, dated Mar. 22, 2019.
Written Opinion of the International Searching Authority of PCT/CN2018/122392 in Chinese, dated Mar. 22, 2019 with English translation.
Extended European Search Report in European Application No. 18907482.6 dated Oct. 27, 2021.
Unidirectional voltage level translators, Open Impulse, Oct. 21, 2021, 3 pages.
Transistors—Level-Shifter, a resistor I dont understand—Electrical Engineering Stack Exchange, Electrical Engineering, Oct. 21, 2021, 4 pages.
European Office Action in European Patent Application No. 18907482.6 dated Jul. 21, 2022.

* cited by examiner

DISPLAY DEVICE INCLUDING SUB LIGHT VALVES SHIELDING SUB-PIXELS IN A RESPONSE PHASE, VIRTUAL REALITY EQUIPMENT, AND DRIVING METHOD

CROSS REFERENCE TO RELATED APPLICATIONS

This application is the National Stage of PCT/CN2018/122392 filed on Dec. 20, 2018, which claims priority under 35 U.S.C. § 119 of Chinese Application No. 201810174749.6 filed on Mar. 2, 2018, the disclosure of which is incorporated by reference.

TECHNICAL FIELD

Embodiments of the present disclosure relate to a display device, a virtual reality equipment, and a driving method.

BACKGROUND

With continuous development of electronic technology, virtual reality (VR) or augmented reality (AR) technology are increasingly applied in daily life such as games and entertainment as high and new technology. The virtual reality technology is also referred to as the vision technology or artificial environment.

The existing virtual reality system mainly simulates a virtual three-dimensional world through a high-performance computing system with a central processing unit, and provides users with a sensory experience of visual sense, auditory sense and the like through a headset equipment, thereby making the users feel like being present on the scene. Simultaneously, the virtual reality system can further provide human-computer interaction.

SUMMARY

At least an embodiment of the present disclosure provides a driving method of a display device. The display device includes a display array and a light valve array, and the display array includes rows of sub-pixels; the light valve array includes a plurality of sub light valves, each of the plurality of sub light valves corresponds to at least one row of sub-pixels, and the light valve array is on a light-emitting side of the display array; and the driving method includes: allowing a sub light valve to be in a light-shielding state in a case where any sub-pixel in the at least one row of sub-pixels corresponding to the sub light valve is in a response phase of a display operation.

For example, the driving method provided by an embodiment of the present disclosure further includes: allowing the sub light valve to be in a light-transmitting state in a case where each sub-pixel in the at least one row of sub-pixels corresponding to the sub light valve is in a display phase of the display operation.

For example, in the driving method provided by an embodiment of the present disclosure, in a case where the rows of sub-pixels in the display array progressively enter the response phase along a scanning direction, the plurality of sub light valves of the light valve array sequentially enter the light-shielding state along the scanning direction; and in a case where the rows of sub-pixels in the display array sequentially enter the display phase from the response phase along the scanning direction, the plurality of sub light valves of the light valve array sequentially change from the light-shielding state to the light-transmitting state along the scanning direction.

For example, the driving method provided by an embodiment of the present disclosure further includes: allowing an (m)th sub light valve of the light valve array to enter the light-shielding state prior to performing the display operation on sub-pixels corresponding to the (m)th sub light valve; performing the display operation on the sub-pixels corresponding to the (m)th sub light valve to allow the sub-pixels corresponding to the (m)th sub light valve to enter the response phase, and simultaneously maintaining the (m)th sub light valve in the light-shielding state; and allowing the (m)th sub light valve to change from the light-shielding state to the light-transmitting state subsequent to each of the sub-pixels corresponding to the (m)th sub light valve entering the display phase from the response phase.

For example, in the driving method provided by an embodiment of the present disclosure, allowing the (m)th sub light valve of the light valve array to enter the light-shielding state prior to performing the display operation on the sub-pixel corresponding to the (m)th sub light valve includes: allowing the (m)th sub light valve to switch from the light-transmitting state to the light-shielding state in a predetermined time prior to performing the display operation on the sub-pixels corresponding to the (m)th sub light valve; and the predetermined time is a one-sided response time of the sub light valve.

For example, the driving method provided by an embodiment of the present disclosure further includes obtaining and storing a length of the predetermined time in advance.

For example, the driving method provided by an embodiment of the present disclosure further includes applying a light-valve driving voltage to the sub light valve to allow the sub light valve to switch between the light-transmitting state and the light-shielding state.

For example, in the driving method provided by an embodiment of the present disclosure, the light-valve driving voltage includes a first light-valve driving voltage and a second light-valve driving voltage, and the first light-valve driving voltage is greater than the second light-valve driving voltage; and applying the light-valve driving voltage to the sub light valve to allow the sub light valve to switch between the light-transmitting state and the light-shielding state includes: applying the first light-valve driving voltage to the sub light valve to allow the sub light valve to switch to the light-shielding state, and applying the second light-valve driving voltage to the sub light valve to allow the sub light valve to switch to the light-transmitting state.

At least an embodiment of the present disclosure further provides a display device, including a display array, a light valve array, and a control device. The display array includes rows of sub-pixels, the light valve array includes a plurality of sub light valves, each of the plurality of sub light valves corresponds to at least one row of sub-pixels, and the light valve array is on a light-emitting side of the display array; and the control device is coupled to the light valve array, and is configured to control a state of the light valve array, so as to allow a sub light valve to be in a light-shielding state in a case where any sub-pixel in the at least one row of sub-pixels corresponding to the sub light valve is in a response phase of a display operation, and is configured to allow the sub light valve to be in a light-transmitting state in a case where each sub-pixel in the at least one row of sub-pixels corresponding to the sub light valve is in a display phase of the display operation.

For example, the display device provided by an embodiment of the present disclosure further includes a plurality of light-valve driving circuits. The plurality of light-valve driving circuits are respectively coupled to the plurality of sub light valves, and the plurality of light-valve driving circuits are configured to receive switch control signals output by the control device, and are further configured to output light-valve driving voltages to drive the plurality of sub light valves respectively.

For example, in the display device provided by an embodiment of the present disclosure, each of the plurality of light-valve driving circuits includes an input sub-circuit and an output sub-circuit; the input sub-circuit is connected to the control device to receive the switch control signal, and is configured to control a level of a control node in response to the switch control signal; and the output sub-circuit is connected to the input sub-circuit and the sub light valve, and is configured to output the light-valve driving voltage to the sub light valve under control of the level of the control node.

For example, in the display device provided by an embodiment of the present disclosure, the input sub-circuit includes a first pull-up resistor and a first transistor; a first terminal of the first pull-up resistor is configured to be connected to a first voltage terminal to receive a first voltage signal, and a second terminal of the first pull-up resistor is configured to be connected to the control node; and a gate electrode of the first transistor is configured to be connected to a switch-control signal terminal to receive the switch control signal, a first electrode of the first transistor is configured to be connected to a second voltage terminal, and a second electrode of the first transistor is configured to be connected to the control node.

For example, in the display device provided by an embodiment of the present disclosure, the output sub-circuit includes a second pull-up resistor and a second transistor; a first terminal of the second pull-up resistor is configured to be connected to a third voltage terminal to receive a third voltage signal, a second terminal of the second pull-up resistor is configured to be connected to an output terminal, and the output terminal is configured to output the light-valve driving voltage; and a gate electrode of the second transistor is connected to the control node, a first electrode of the second transistor is connected to a second voltage terminal, and a second electrode of the second transistor is connected to the output terminal.

For example, the display device provided by an embodiment of the present disclosure further includes a power supply circuit and a voltage boosting circuit. The power supply circuit is configured to provide a display driving voltage to the display array, and the voltage boosting circuit is coupled to the power supply circuit and is configured to provide the plurality of light-valve driving circuits with a third voltage signal obtained by boosting the display driving voltage.

For example, in the display device provided by an embodiment of the present disclosure, the display array includes a display driving circuit, and the display driving circuit and the plurality of light-valve driving circuits are integrated on a same circuit board.

For example, in the display device provided by an embodiment of the present disclosure, the display array is a liquid crystal display array, and the light valve array is a liquid crystal light-valve array.

At least an embodiment of the present disclosure further provides an display device, including a display array, a light valve array, and a control device. The display array includes rows of sub-pixels, and a display operation of the sub-pixel includes a response phase and a display phase subsequent to the response phase; the light valve array includes a plurality of sub light valves, and is on a light-emitting side of the display array; and the control device is coupled to the light valve array, and is configured to control a state of the light valve array, so as to allow the sub light valve corresponding to the sub-pixel in the display operation to be in a light-shielding state in a case where the sub-pixel in the display array is in the response phase of the display operation.

For example, in the display device provided by an embodiment of the present disclosure, the light valve array includes N sub light valves, the display array includes N display sub-regions, the N sub light valves respectively correspond to the N display sub-regions, and N is an integer greater than zero.

For example, in the display device provided by an embodiment of the present disclosure, each display sub-region of the display array includes one row of sub-pixels or rows of sub-pixels; and the control device is configured to allow the sub light valve corresponding to the display sub-region to be in the light-shielding state in a case where any sub-pixel in the display sub-region of the display array is in the response phase, and is configured to allow the sub light valve corresponding to the display sub-region to be in a light-transmitting state in a case where each sub-pixel in the display sub-region of the display array is in the display phase.

For example, the display device provided by an embodiment of the present disclosure further includes N light-valve driving circuits. The N light-valve driving circuits are respectively coupled to the N sub light valves, and are configured to receive switch control signals output by the control device to drive the N sub light valves respectively.

For example, in the display device provided by an embodiment of the present disclosure, each of the N light-valve driving circuits includes an input sub-circuit and an output sub-circuit. The input sub-circuit is configured to control a level of the control node in response to the switch control signal; and the output sub-circuit is configured to output the light-valve driving voltage to the corresponding sub light valve under control of the level of the control node.

For example, in the display device provided by an embodiment of the present disclosure, the input sub-circuit includes a first pull-up resistor and a first transistor. A first terminal of the first pull-up resistor is configured to be connected to a first voltage terminal to receive a first voltage signal, and a second terminal of the first pull-up resistor is configured to be connected to the control node; and a gate electrode of the first transistor is configured to be connected to a switch-control signal terminal to receive the switch control signal, a first electrode of the first transistor is configured to be connected to a second voltage terminal, and a second electrode of the first transistor is configured to be connected to the control node.

For example, in the display device provided by an embodiment of the present disclosure, the output sub-circuit includes a second pull-up resistor and a second transistor. A first terminal of the second pull-up resistor is configured to be connected to a third voltage terminal to receive a third voltage signal, a second terminal of the second pull-up resistor is configured to be connected to an output terminal, and the output terminal is configured to output the light-valve driving voltage; and a gate electrode of the second transistor is connected to the control node, a first electrode of the second transistor is connected to a second voltage terminal, and a second electrode of the second transistor is connected to the output terminal.

For example, the display device provided by an embodiment of the present disclosure further includes a power supply circuit and a voltage boosting circuit. The power supply circuit is configured to provide a display driving voltage to the display array, and the voltage boosting circuit is coupled to the power supply circuit and is configured to boost the display driving voltage and output the display driving voltage boosted as the light-valve driving voltage.

For example, in the display device provided by an embodiment of the present disclosure, the display array includes a display driving circuit, and the light-valve driving circuit and the display driving circuit are integrated on a same circuit board.

For example, in the display device provided by an embodiment of the present disclosure, the display array is a liquid crystal display array.

For example, in the display device provided by an embodiment of the present disclosure, the light valve array is a liquid crystal light-valve array, the liquid crystal light-valve array includes a liquid crystal layer and a driving electrode array, and the driving electrode array is configured to drive liquid crystal layers at different positions.

At least an embodiment of the present disclosure further provides a virtual reality equipment, including the display device provided by any one of the embodiments of the present disclosure.

At least an embodiment of the present disclosure further provides a driving method of the display device, including: allowing the sub light valve corresponding to the sub-pixel in the display operation to be in the light-shielding state in a case where the sub-pixel in the display array is in the response phase of the display operation; and allowing the sub light valve corresponding to the display sub-region in the display phase to be in the light-transmitting state in a case where each sub-pixel in the display sub-region of the display array is in the display phase of the display operation.

For example, in the driving method provided by an embodiment of the present disclosure, in a case where the sub-pixels in the display array progressively enter the response phase along a scanning direction, the sub light valves in the light valve array sequentially enter the light-shielding state along the scanning direction; and in a case where all the display sub-regions of the display array sequentially enter the display phase from the response phase along the scanning direction, the sub light valves in the light valve array sequentially change from the light-shielding state to the light-transmitting state.

For example, in the driving method provided by an embodiment of the present disclosure, an (m)th display sub-region corresponds to an (m)th sub light valve, and m is an integer greater than 0; and the driving method includes: allowing the (m)th sub light valve to enter the light-shielding state prior to progressively scanning the (m)th display sub-region; progressively scanning the (m)th display sub-region to allow sub-pixels in the (m)th display sub-region to enter the response phase, and simultaneously maintaining the (m)th sub light valve in the light-shielding state; and allowing the (m)th sub light valve to change from the light-shielding state to the light-transmitting state in a case where all the sub-pixels in the (m)th display sub-region enter the display phase from the response phase.

For example, in the driving method provided by an embodiment of the present disclosure, the allowing the (m)th sub light valve to enter the light-shielding state prior to progressively scanning the (m)th display sub-region includes: allowing the (m)th sub light valve to switch from the light-transmitting state to the light-shielding state in a predetermined time prior to progressively scanning the (m)th display sub-region; and the predetermined time is equal to a one-sided response time of the sub light valve.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1:
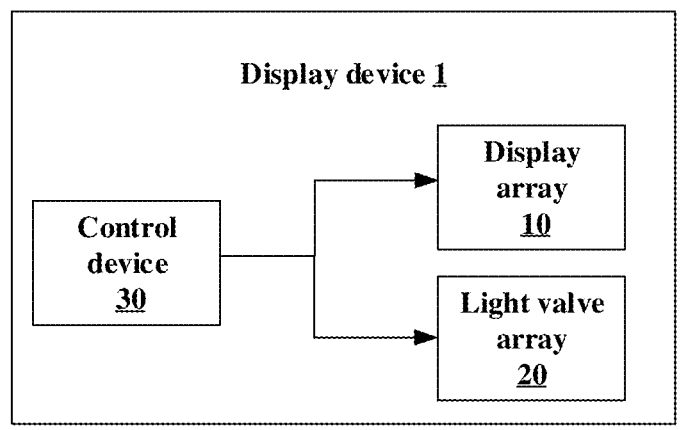
FIG. 1 is a schematic diagram of a display device provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Hereinafter, the embodiments of the present disclosure will be described in detail with reference to the accompanying drawings. It should be noted that in the accompanying drawings, the same reference symbol substantially indicates the component with the same or similar structure and function, and the repeated description thereof will be omitted.

In the virtual reality technology, liquid crystal display (LCD) devices are widely used because of their significant advantages in resolution and screen-door effect. However, because an LCD device uses deflection of liquid crystal molecules for display, a response time of the LCD device is long and is usually 20-30 ms, which may allow the image displayed by the display device to appear blurred. Especially in a case where a user's head rotates rapidly, the image displayed by the display device changes rapidly. If the response time of the display device is long, the blurring of the display image will be enhanced, which seriously affects the user experience. Even if the LCD device uses a fast-response liquid crystal, the response time can only be reduced to about 3 ms, which still does not meet the ideal requirement.

At least an embodiment of the present disclosure provides a display device, comprising a display array, a light valve array, and a control device. The display array comprises rows of sub-pixels, and a display operation of the sub-pixel includes a response phase and a display phase subsequent to the response phase. The light valve array includes a plurality of sub light valves, and the light valve array is on a light-emitting side of the display array. The control device is coupled to the light valve array, and is configured to control a state of the light valve array, so as to allow the sub light valve corresponding to the sub-pixel in the display operation to be in a light-shielding state in a case where the sub-pixel in the display array is in the response phase of the display operation.

At least an embodiment of the present disclosure further provides a driving method corresponding to the above display device and a virtual reality equipment.

The display device, the virtual reality equipment, and the driving method provided by the embodiments of the present disclosure can shield the blurred image displayed by the display device when the sub-pixels in the display device are in the response phase, so that a user only sees the image in a case where the sub-pixels in the display device are in the display phase subsequent to the response phase. Therefore, the blurred image caused by a long response time of the display device is solved, and a smear phenomenon of the display device is reduced, thereby improving the display quality of the display device and allowing the user to have a more realistic experience in a virtual scene.

Hereinafter, the embodiments of the present disclosure will be described in detail with reference to the accompanying drawings.

FIG. 1 is a schematic diagram of a display device provided by an embodiment of the present disclosure. As illustrated in FIG. 1, the display device 1 includes a display array 10, a light valve array 20, and a control device 30.

For example, the display array 10 includes rows of sub-pixels 18. For example, a display operation of each sub-pixel includes a response phase and a display phase subsequent to the response phase. For example, the display array 10 can adopt a liquid crystal display array, and the liquid crystal material in the liquid crystal display array can be, for example, a fast-response liquid crystal material. It should be noted that the embodiments of the present disclosure include, but are not limited thereto, and the display array 10 can also be a display array of other type. The response phase is a phase in which a liquid crystal layer in the sub-pixel is deflected in response to a refresh pulse. Because the response time of liquid crystal molecules in the liquid crystal layer is long, the display array may, for example, occur a blurring phenomenon in the response phase. The display phase is a phase of normal display after the liquid crystal layer in the sub-pixel is deflected.

For example, the light valve array 20 includes a plurality of sub light valves, each of the plurality of sub light valves corresponds to at least one row of sub-pixels, and the light valve array 20 is located on a light-emitting side of the display array 10 and corresponds to the display array 10. For example, the light valve array 20 can adopt a liquid crystal light valve, and the liquid crystal material in the liquid crystal light valve can, for example, adopt the same fast-response liquid crystal material as the display array 10.

Figure 2:
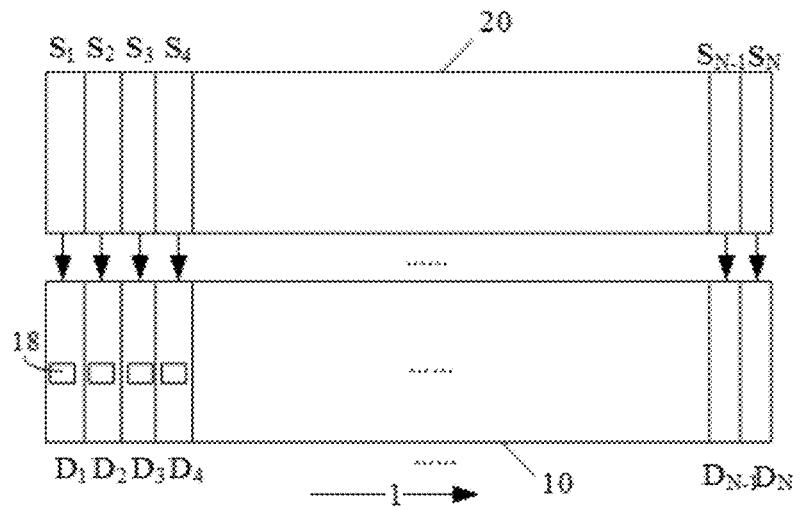
FIG. 2 is a schematic diagram of an arrangement of a light valve array and a display array in the display device illustrated in FIG. 1.

The light valve array 20 can correspond to the display array 10 in a manner as illustrated in the following. For example, as illustrated in FIG. 2, the light valve array 20 includes N (N is an integer greater than 0) parallel sub light valves $S_1, S_2, \ldots, S_N$, the display array 10 can be correspondingly divided into N parallel display sub-regions $D_1, D_2, \ldots, D_N$, and each display sub-region includes one or more rows of sub-pixels. The N sub light valves are respectively in one-to-one correspondence with the N display sub-regions. For example, a first sub light valve $S_1$ is on a first display sub-region $D_1$ of the display array 10, and an (N)th sub light valve $S_N$ is on an (N)th display sub-region $D_N$ of the display array 10. For example, the arrangement direction of the N sub light valves coincides with the row scanning direction of the display array 10 or the arrangement direction of rows of the sub-pixels, and for example, as illustrated in FIG. 2, the row scanning direction is a direction of an arrow 1. For example, the arrangement direction of gate lines of the display array 10 is the direction of the arrow 1 illustrated in FIG. 2, thereby the row scanning direction of the display array 10 is a progressively or interlaced scanning direction from the first display sub-region $D_1$ to the (N)th display sub-region $D_N$. For example, with the scanning operation, the N display sub-regions of the display array 10 sequentially enter a display phase. For example, the row scanning direction of sub-pixels in the display array in the embodiments of the present disclosure may be a scanning direction from the left eye to the right eye as illustrated in FIG. 7B or a scanning direction from the right eye to the left eye. It should be noted that in the embodiments of the present disclosure, the extending directions of rows and columns are not limited.

For example, the control device 30 is configured to sequentially control states of the N sub light valves as the N display sub-regions of the display array 10 sequentially perform the display operation along the scanning direction. For example, in a case where any one of the sub-pixels in an (n)th (n is an integer greater than 0) display sub-region is in the response phase, correspondingly, the sub light valve covering the (n)th display sub-region is in the light-shielding state; and in a case where each sub-pixel in the (n)th display sub-region is in the display phase, correspondingly, the sub light valve covering the (n)th display sub-region is in the light-transmitting state. Therefore, the blurred image which is generated during a deflection phase of liquid crystal molecules in the display array 10 can be covered, so as not to be perceived by a user, and only the image after the deflection of liquid crystal molecules in the display array 10 is displayed, thereby improving the display quality of the display device.

The light valve array 20 further includes a plurality of driving electrodes. For example, each driving electrode drives a sub light valve, and the driving electrode is configured to drive deflection of liquid crystal in the sub light valve to allow the liquid crystal to switch between the light-transmitting state and light-shielding state. The specific working principle will be described in detail later. For example, the light valve array 20 can be divided into 32 parallel sub light valves, and corresponding to a display array 10 with a resolution of 1920*1080, the width of the driving electrode included in each sub light valve is a width of 60 rows of sub-pixels. Correspondingly, the display array 10 is divided into 32 parallel display sub-regions, and each display sub-region includes 60 rows of sub-pixels. For example, in a case where all the sub-pixels in a display sub-region enter the display phase, a corresponding sub light valve is then switched from the light-shielding state to the light-transmitting state. It should be noted that the embodiments of the present disclosure include but are not limited thereto, and an amount of the parallel display sub-regions can be specifically determined according to specific situations, and for example, can also be 64, 128, or the like.

For example, the control device 30 is coupled to the light valve array 20, and the control device 30 is configured to control the state of the light valve array 20 to allow the sub light valve corresponding to the sub-pixel in the display operation to be in the light-shielding state in a case where the sub-pixel in the display array 10 is in the response phase of the display operation. For example, the control device 30 can further be coupled to the display array 10 and can be configured to control the display operation of the display array 10, thereby being convenient to control the display array 10 and the light valve array 20 synchronously. For example, in a case where the control device 30 controls the display array 10 to perform the display operation, the control device 30 can obtain a time which the display array 10 is at (for example, prior to the response phase, during the response phase, during the display phase, etc.), so that the control device 30 can control the state of the light valve array 20 based on the time which the display array 10 is at, thereby controlling the display array 10 and the light valve array 20 synchronously.

At least an embodiment of the present disclosure further provides a display device, including a display array, a light valve array, and a control device. The display array includes rows of sub-pixels, the light valve array includes a plurality of sub light valves, each of the plurality of sub light valves corresponds to at least one row of sub-pixels, and the light valve array is on a light-emitting side of the display array. The control device is coupled to the light valve array, and is configured to control a state of the light valve array, so as to allow a sub light valve to be in a light-shielding state in a case where any sub-pixel in the at least one row of sub-pixels corresponding to the sub light valve is in a response phase of a display operation, and is configured to allow the sub light valve to be in a light-transmitting state in a case where the at least one row of sub-pixels corresponding to the sub light valve are in a display phase of the display operation.

In the present disclosure, the control device 30 can be various devices which can implement a control function, such as a central processing unit (CPU), a digital signal processor (DSP), etc., and can further be implemented through a semiconductor chip, a field programmable gate array (FPGA) or other manners.

For example, the control device 30 can include a processor and a memory (not shown). The processor may be a central processing unit (CPU) or other forms of processing units having data processing capability and/or instruction executing capability, may be a general purpose processor or a dedicated processor, and may be a processor based on an X86 or ARM structure or the like. The memory may include one or more computer program products, and the computer program product may include various forms of computer readable storage mediums, such as volatile memory and/or non-volatile memory. The volatile memory may include, for example, a random access memory (RAM) and/or a cache, etc. The non-volatile memory may include, for example, a read-only memory (ROM), a hard disk, a flash memory, or the like. One or more computer program instructions can be stored on the computer readable storage medium, and the processor can execute the program instructions to implement the functions (implemented by the processor) and/or other desired functions (such as encoding/decoding, synchronized correction, and the like) described in the embodiments of the present disclosure. Various applications and data can also be stored in the computer readable storage medium.

Figure 3:
FIG. 3 is a schematic structural diagram of the display device illustrated in FIG. 1.

For example, exemplary structures of the display array 10 and the light valve array 20 in the display device 1 are as illustrated in FIG. 3. The display array 10 and light valve array 20 are disposed in an overlapping manner. For example, the display array 10 includes an array substrate 12, an opposite substrate 15, and a liquid crystal layer (not shown in FIG. 3). The array substrate 12 and the opposite substrate 15 which are disposed opposite to each other are bonded by a sealing component 14 (such as a sealant) with a frame shape. The liquid crystal material is disposed in the space between the array substrate 12, the opposite substrate 15, and the sealing component 14 to form the liquid crystal layer. For example, the opposite substrate 15 is a color filter substrate having a RGB color filter. For example, the array substrate 12 is an active array substrate, and the active array substrate adopts a thin film transistor (TFT) as a switch component of the sub-pixel and drives each sub-pixel by an active matrix driving method. For example, the sub-pixel in the display array 10 further includes a pixel electrode 13 and a common electrode (not shown in FIG. 3), and the display array 10 can be of various types such as a horizontal electric field type (for example, an IPS type or an ADS type) or a vertical electric field type (for example, a TN type). Therefore, the pixel electrode and the common electrode can both be formed on the array substrate 12, or can be formed on the array substrate 12 and the opposite substrate 15, respectively. For example, when voltages are applied to the pixel electrode 13 and the common electrode, an electric field is formed between the pixel electrode 13 and the common electrode, and liquid crystal molecules in the liquid crystal layer are arranged along the direction of the electric field to rotate in a plane. For example, the display array 10 further includes a lower polarizer 11 and an upper polarizer 17. For example, when external light (for example, light provided by a backlight source located on a lower side of the display array 10 in FIG. 3) is irradiated on the display array 10 from one side of the array substrate 12, the light through the lower polarizer 11 and through the liquid crystal layer is in a polarized state, so that the light is emitted through the liquid crystal layer and the upper polarizer 17.

For example, the display array 10 further includes a display driving circuit, and the display driving circuit is integrated on a circuit board 16 on one side of the display array 10 and is connected to the control device 30 through a wire to apply voltages to the pixel electrode 13 and the common electrode of the sub-pixel, so as to control the degree of deflection of liquid crystal molecules in the liquid crystal layer, thereby realizing the gray level display.

For example, as illustrated in FIG. 3, the light valve array 20 is disposed on the light-emitting side of the display array 10, and for example, the light valve array 20 is disposed on the opposite substrate 15 of the display array 10. For example, the light valve array 20 includes a first transparent substrate 22, a second transparent substrate 25, a first transparent electrode 23 on the first transparent substrate 22, and a second transparent electrode 24 on the second transparent substrate 25, that is, the exemplary light valve array 20 is of a vertical electric field type. For example, the light valve array 20 further includes a liquid crystal layer 28 between the first transparent electrode 23 and the second transparent electrode 24. For example, the first transparent electrode 23 and the second transparent electrode 24 constitute a driving electrode array for driving the liquid crystal layer 28 at different positions. For example, this liquid crystal layer 28 can be the same as the liquid crystal layer in the display array 10. For example, the first transparent substrate 22 and the second transparent substrate 25 which are disposed opposite to each other are bonded by a sealing component 27 (such as a sealant) with a frame shape. The liquid crystal material is disposed in an enclosed space formed by the first transparent substrate 22, the second transparent substrate 25, and the sealing component 27 to form the liquid crystal layer 28.

For example, the first transparent electrode 23 and the second transparent electrode 24 are disposed opposite to each other. For example, the material of the first transparent electrode 23 and the material of the second transparent electrode 24 can be a transparent conductive material. For example, the transparent conductive material can be a material including a transparent metal oxide such as indium tin oxide (ITO) or indium zinc oxide (IZO). For example, the material of the first transparent substrate 22 and the material of the second transparent substrate 25 can be a transparent material such as a glass base material or a resin base material. It should be noted that the materials used for the first transparent substrate 22 and the second transparent substrate 25 can be the same or can be different, and can further be any combination of the glass base material or the resin base material.

In the present disclosure, as illustrated in FIG. 3, for example, the first transparent electrode 23 is disposed as a planar common electrode, and the shape of the second transparent electrode 24 can be disposed as a strip, thereby allowing the first transparent electrode 23 and the second transparent electrode 24 to control the deflection of the liquid crystal layer 28 corresponding to an overlapping portion between the first transparent electrode 23 and the second transparent electrode 24. For example, the light valve array 20 includes N second transparent electrodes 24 in a parallel arrangement, and the N second transparent electrodes 24 are located in N sub light valves respectively. For example, each second transparent electrode 24 with the strip shape and the opposite first transparent electrode 23 form a pair of driving electrodes, and each pair of driving electrodes can be driven independently. For example, an (n)th sub light valve is driven by an (n)th pair of driving electrodes. For example, the (n)th pair of driving electrodes includes the second transparent electrode 24 and the corresponding first transparent electrode 23, and the corresponding liquid crystal molecules are driven by the electric field formed between the second transparent electrode 24 and the corresponding first transparent electrode 23 to control the (n)th sub light valve to switch between the light-transmitting state and the light-shielding state. For example, each second transparent electrode 24 is connected to the light-valve driving circuit by a wire (not shown in FIG. 3) located on the left or right side of the light valve array 20. For example, the first transparent electrode 23 can be connected to a common voltage terminal (not shown in FIG. 3) on the circuit board 26 of the light valve array 20 to receive a common voltage. For example, the N second transparent electrodes 24 can be connected to the N light-valve driving circuits respectively. Therefore, the corresponding light-valve driving voltages can be input to the N second transparent electrodes 24 respectively, and each driving electrode in the driving electrode array can be driven independently.

For example, in another example, different from FIG. 3, the light valve array 20 can include a plurality of first transparent electrodes. These first transparent electrodes can be strip electrodes in the same arrangement direction as the second transparent electrodes 24, and are in one-to-one correspondence with the second transparent electrodes 24, thereby forming N pairs of driving electrodes for controlling the deflection of the liquid crystal layer corresponding to the overlapping portion. In this example, these first transparent electrodes can be applied with the common voltage to be configured as common electrodes.

For example, the light-valve driving circuit 400 can be integrated on the circuit board 26 of the light valve array 20. It should be noted that the circuit board 26 of the light-valve driving circuit 400 and the circuit board 16 of the display driving circuit 800 can also be integrated into a same circuit board. For example, both the circuit board 16 and the circuit board 26 can use a flexible printed circuit (FPC). For example, in a case where any sub-pixel in the (n)th (n is an integer greater than 0) display sub-region is in the response phase, the light-valve driving circuit applies the corresponding light-valve driving voltage to the pair of driving electrodes included in the (n)th sub light valve to control deflection of liquid crystal molecules in the sub light valve, thereby allowing the sub light valve to change to the light-shielding state. For example, in a case where all the sub-pixels in the (n)th display sub-region are in the display phase, the sub light valve accordingly changes to the light-transmitting state.

For example, the light valve array 20 further includes an upper polarizer 21. For example, the upper polarizer 17 of the display array 10 can be configured to be the lower polarizer of the light valve array 20. Alternatively, the lower polarizer of the light valve array 20 can be separately provided, and has the same polarization direction as the upper polarizer 17 of the display array 10. For example, in a case where the light polarized by the liquid crystal layer of the display array 10 is irradiated on the light valve array 20 from one side of the second transparent substrate 25 of the light valve array 20, the light through the upper polarizer 17 of the display array 10 (i.e., the lower polarizer of the light valve array 20) and through the liquid crystal layer 28 in the light valve array 20 is in a polarized state, so that the light can be emitted through the liquid crystal layer and through the upper polarizer 21.

For example, the control device 30 controls a voltage pulse to be input to the light-valve driving circuit, and the light-valve driving circuit inputs the driving voltage to the second transparent electrode 24, and controls deflection of liquid crystal molecules in the liquid crystal layer 28 by changing the voltage applied to the second transparent electrode 24, thereby controlling each of the sub light valves in the light valve array 20 to switch between the light-transmitting state and the light-shielding state.

The display device can shield the blurred image displayed in a case where the sub-pixels in the display device are in the response phase, and can allow a user to see only the image in a case where the sub-pixels in the display device are in the display phase subsequent to the response phase. Therefore, the blurred image caused by the long response time of the display device is avoided, and the smear phenomenon of the display device is reduced, thereby improving the display quality of the display device and allowing the user to have a more realistic experience in a virtual scene.

Figure 4:
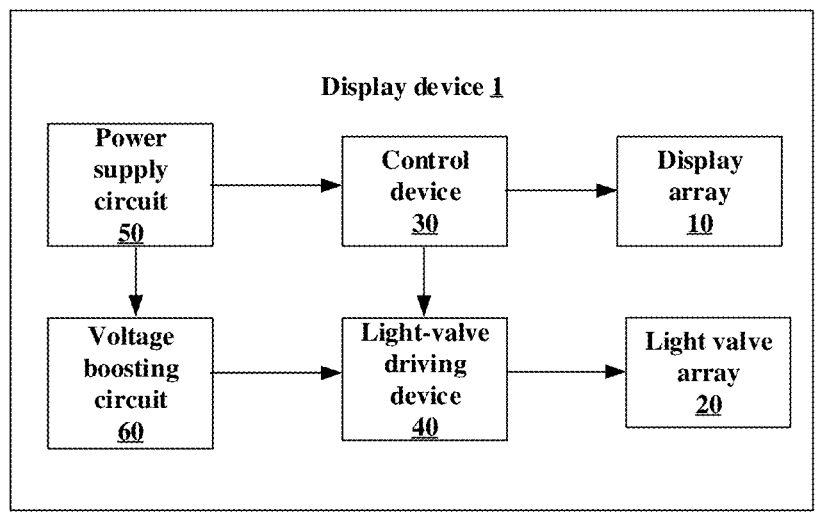
FIG. 4 is a schematic diagram of another display device provided by an embodiment of the present disclosure.

As illustrated in FIG. 4, in another embodiment of the present disclosure, the display device 1 further includes a light-valve driving device 40, a power supply circuit 50 and a voltage boosting circuit 60 based on the embodiment illustrated in FIG. 1.

For example, the power supply circuit 50 is configured to provide a display driving voltage to the display array 10. For example, a voltage output by the power supply circuit 50 may be 4.2V and may be sent to the control device 30 and the voltage boosting circuit 60, respectively. For example, the control device 30 converts the voltage output by the power supply circuit 50 into a corresponding display driving voltage to drive the display array 10 to display. For example, the display driving voltage can be a voltage which is applied to the pixel electrode and the common electrode for driving liquid crystal molecules in the liquid crystal layer to deflect.

For example, the voltage boosting circuit 60 is coupled to the power supply circuit 50, and is configured to provide the light-valve driving device 40 with a third voltage signal obtained by boosting the display driving voltage. For example, the voltage boosting circuit 60 can adopt a DCDC voltage converting chip. The voltage boosting circuit 60 pulls up the voltage outputted by the power supply circuit 50 to the third voltage signal, and inputs the third voltage signal to the light-valve driving device 40 to output the light-valve driving voltage to the driving electrode of the corresponding sub light valve through the light-valve driving device 40. For example, the light-valve driving voltage may be 5.8V-8V in the present disclosure. By providing the voltage boosting circuit 60, the display device 1 does not need to separately provide a power supply circuit for the light valve array 20, so that the display array 10 and the light valve array 20 can share a same power supply circuit. It should be noted that the display driving voltage, provided by the power supply circuit 50, of the display array 10 and the light-valve driving voltage, provided by the power supply circuit 50, of the light valve array 20 can be determined according to specific situations, and the embodiments of the present disclosure are not limited thereto.

Figure 5:
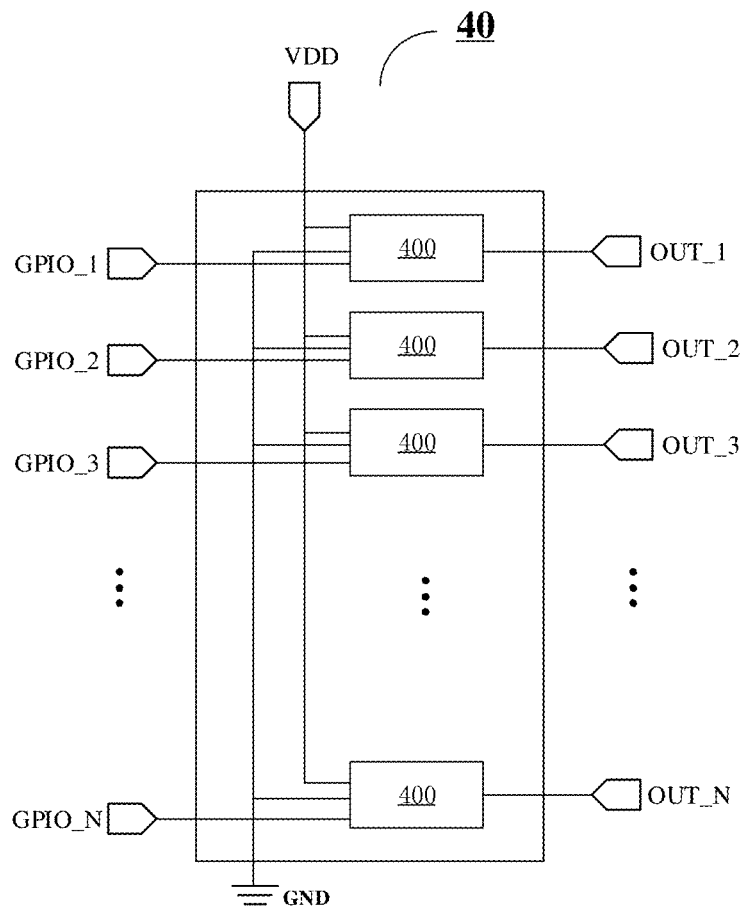
FIG. 5 is a schematic diagram of a light-valve driving device in the display device illustrated in FIG. 4.

For example, as illustrated in FIG. 5, the light-valve driving device 40 includes N light-valve driving circuits 400. For example, the N light-valve driving circuits 400 are respectively coupled to the driving electrodes of the N sub light valves $S_1, S_2, \ldots, S_N$, and are configured to receive switch control signals (for example, GPIO_1, GPIO_2, GPIO_3, GPIO_N illustrated in FIG. 5) output by the control device 30 and to output the light-valve driving voltages to drive the N sub light valves respectively. For example, an output terminal OUT_1 of the first light-valve driving circuit 400 is coupled to the first second transparent electrode 24 in the light valve array 20 for controlling the light-transmitting state of the first sub light valve, and an output terminal OUT_N of the (N)th light-valve driving circuit 400 is coupled to the (N)th second transparent electrode 24 for controlling the light-transmitting state of the (N)th sub light valve.

Figure 6A:
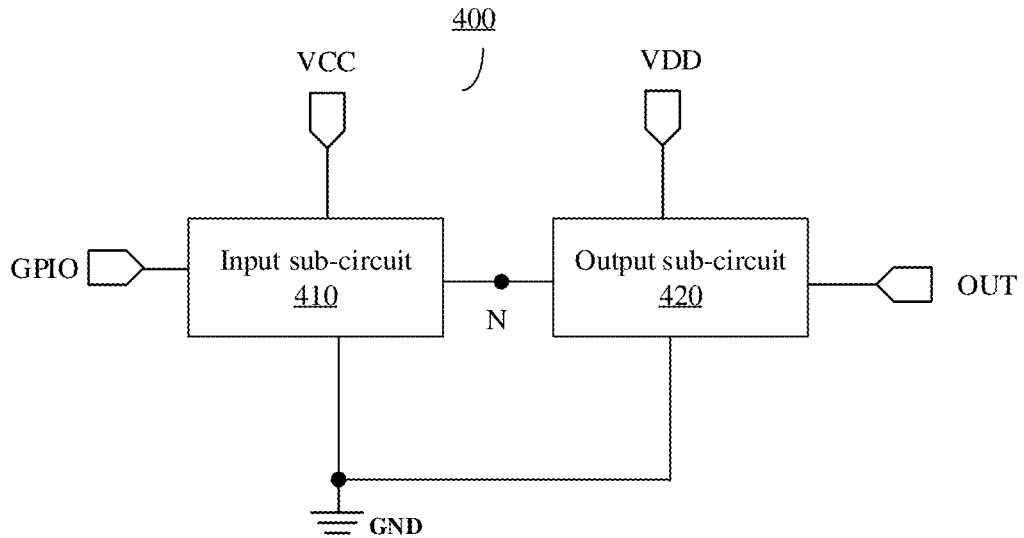
FIG. 6A is a schematic diagram of a light-valve driving circuit in the light-valve driving device illustrated in FIG. 5.

FIG. 6A is a schematic diagram of a light-valve driving circuit 400 in the light-valve driving device 40 illustrated in FIG. 5. For example, as illustrated in FIG. 6A, each light-valve driving circuit 400 includes an input sub-circuit 410 and an output sub-circuit 420.

The input sub-circuit 410 is connected to the control device to receive the switch control signal, and is configured to control a level of a control node N in response to the switch control signal GPIO. For example, the input sub-circuit 410 is connected to a first voltage terminal VCC, a second voltage terminal GND, and a switch-control signal terminal GPIO, and is configured to allow the control node N to be connected to the second voltage terminal GND under control of a low level input by the switch-control signal terminal GPIO, thereby pulling down the level of the control node N. For example, the first voltage terminal VCC can be configured to keep inputting a DC high-level signal, and the second voltage terminal GND is, for example, a grounded terminal. For example, the DC high-level signal input by the first voltage terminal VCC is referred to as a first voltage signal, and for example, a grounded signal provided by the second voltage terminal GND is referred to as a second voltage signal, which is the same in the following embodiments and will not be described again. For example, in the present disclosure, the first voltage signal input by the first voltage terminal VCC can adopt a DC voltage signal of 5V. It should be noted that the embodiments of the present disclosure include but are not limited thereto, and the magnitude of the first voltage signal can be determined according to specific situations.

The output sub-circuit 420 is connected to the input sub-circuit 410 and the sub light valve, and is configured to output the light-valve driving voltage to the corresponding sub light valve under control of the level of the control node N. For example, the output sub-circuit 420 is connected to the second voltage terminal GND, a third voltage terminal VDD, and an output terminal OUT, and is configured to convert the third voltage signal input by the third voltage terminal VDD into the light-valve driving voltage under control of the level of the control node N and output it to the output terminal OUT of the light-valve driving circuit 400. For example, the output terminal OUT is coupled to the second transparent electrode. For example, the third voltage terminal VDD can be configured to keep inputting a DC high-level signal, and the DC high level signal is referred to as a third voltage signal, which is the same in the following embodiments and will not be described again. For example, the third voltage signal is a voltage output by the voltage boosting circuit 60. For example, in the present disclosure, the value of the third voltage signal is the magnitude of the light-valve driving voltage required by the light valve array 20, and for example, the value of the third voltage signal can be any value between 5.8V and 8V. It should be noted that the embodiments of the present disclosure include, but are not limited thereto, and the magnitude of the third voltage signal may be determined according to specific situations.

Figure 6B:
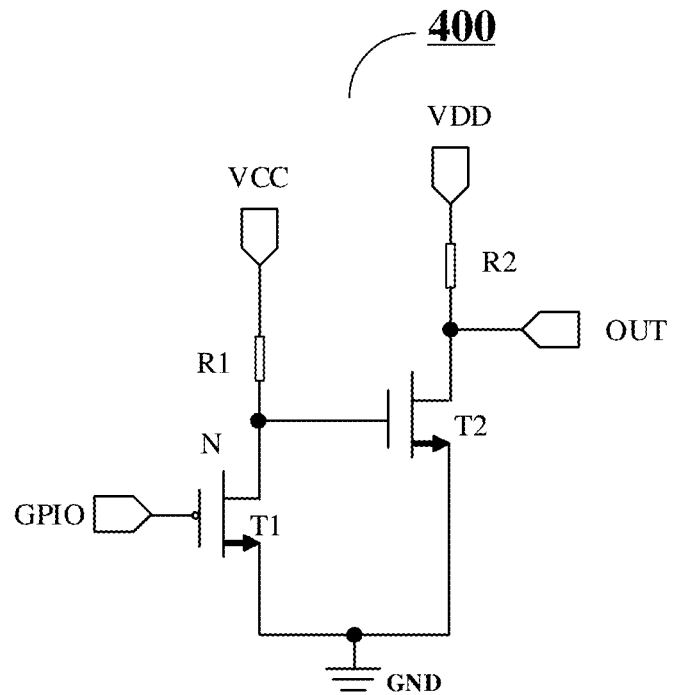
FIG. 6B is a circuit diagram of a specific implementation example of the light-valve driving circuit illustrated in FIG. 6A.

For example, as illustrated in FIG. 6B, the input sub-circuit 410 can be implemented as a first pull-up resistor R1 and a first transistor T1. A first terminal of the first pull-up resistor R1 is configured to be connected to the first voltage terminal VCC to receive the first voltage signal, and a second terminal of the first pull-up resistor R1 is configured to be connected to the control node N. A gate electrode of the first transistor T1 is configured to be connected to the switch-control signal terminal GPIO to receive the switch control signal, a first electrode of the first transistor T1 is configured to be connected to the second voltage terminal GND, and a second electrode of the first transistor T1 is configured to be connected to the control node N. For example, in the present disclosure, the resistance of the first pull-up resistor R1 is about 10K. For example, the first transistor T1 can adopt a P-type transistor. For example, the first transistor T1 can also be replaced with a PNP type transistor 2N2905 to implement the corresponding function. It should be noted that the embodiments of the present disclosure include but are not limited thereto. The first transistor T1 can be any other transistor capable of implementing the corresponding function, and the resistance of the first pull-up resistor R1 is determined according to specific situations. The embodiments of the present disclosure do not limit this.

For example, the output sub-circuit 420 can be implemented as a second pull-up resistor R2 and a second transistor T2. A first terminal of the second pull-up resistor R2 is configured to be connected to the third voltage terminal VDD to receive the third voltage signal, and a second terminal of the second pull-up resistor R2 is configured to be connected to the output terminal OUT to output the light-valve driving voltage. A gate electrode of the second transistor T2 is connected to the control node N, a first electrode of the second transistor T2 is connected to the second voltage terminal GND, and a second electrode of the second transistor T2 is connected to the second terminal of the second pull-up resistor R2, that is, connected to the output terminal OUT. For example, in the present disclosure, the resistance of the second pull-up resistor R2 is about 100K. It should be noted that, in the embodiments of the present disclosure, the second pull-up resistor R2 can function as a voltage division. For example, in a case where the third voltage signal is fixed, the value of the light-valve driving voltage output by the output terminal OUT can be adjusted by adjusting the value of the second pull-up resistor R2.

For example, the second transistor T2 can adopt an N-type transistor. For example, the second transistor T2 can also be replaced with an N-type field effect transistor IRF540 to implement the corresponding function. It should be noted that the embodiments of the present disclosure include but are not limited thereto, the second transistor T2 can be any other transistor capable of implementing the corresponding function, and the magnitude of the resistance of the second pull-up resistor R2 is determined according to specific situations. The embodiments of the present disclosure do not limit this.

It should be noted that each of the transistors adopted in the embodiments of the present disclosure may be a thin film transistor, a field effect transistor or other switch components having the same performance. In the embodiments of the present disclosure, the thin film transistor is taken as an example for description. The source electrode and drain electrode of the transistor used here may be structurally symmetrical, so that the source electrode and the drain electrode may be structurally indistinguishable. In the embodiments of the present disclosure, in order to distinguish the two electrodes of the transistor other than the gate electrode, one electrode is directly described as the first electrode, and the other electrode is directly described as the second electrode.

In the following, the working principle of the light-valve driving circuit illustrated in FIG. 6A and FIG. 6B will be described with reference to the signal timing diagram illustrated in FIG. 7A and the schematic diagram illustrated in FIG. 7B.

For example, a scanning direction of the display array 10 is from the first display sub-region $D_1$ to the (N)th display sub-region $D_N$, and for example, is as indicated by an arrow 2 in FIG. 7B. For example, as the display array 10 is sequentially scanned, the sub-pixels in the N display sub-regions of the display array 10 sequentially enter the display phase. For example, the display array 10 is scanned from the first display sub-region $D_1$ to the (m)th display sub-region $D_m$. As illustrated in FIG. 7B, any one of the sub-pixels in the (m)th display sub-region is in the response phase of the liquid crystal, so that the (m)th sub light valve which covers the (m)th display sub-region $D_m$ is in the light-shielding state, such as the black state region 102 illustrated in FIG. 7B, and the blurred image, generated by the response phase of the liquid crystal, in the (m)th display sub-region is shielded, thereby improving the visual experience of the user. For example, as illustrated in FIG. 7B, in a case where all the sub-pixels in the display sub-region are in the display phase, correspondingly, the corresponding sub light valve is in the light-transmitting state, such as the white state region 101 illustrated in FIG. 7B. For example, the scanning direction of the display array 10 is the direction of the arrow 2 in FIG. 7B, the direction in which the sub light valve turns to the black state is, for example, a direction of an arrow 3 in FIG. 7B, and the direction of the arrow 3 coincides with the direction of the arrow 2. For example, in the present disclosure, in a case where the current display array 10 is scanned to the (n)th display sub-region, the light-valve driving circuit performs the following operations in the first phase 1, the second phase 2, the third phase 3, and the fourth phase 4 illustrated in FIG. 7A, respectively.

Figure 7A:
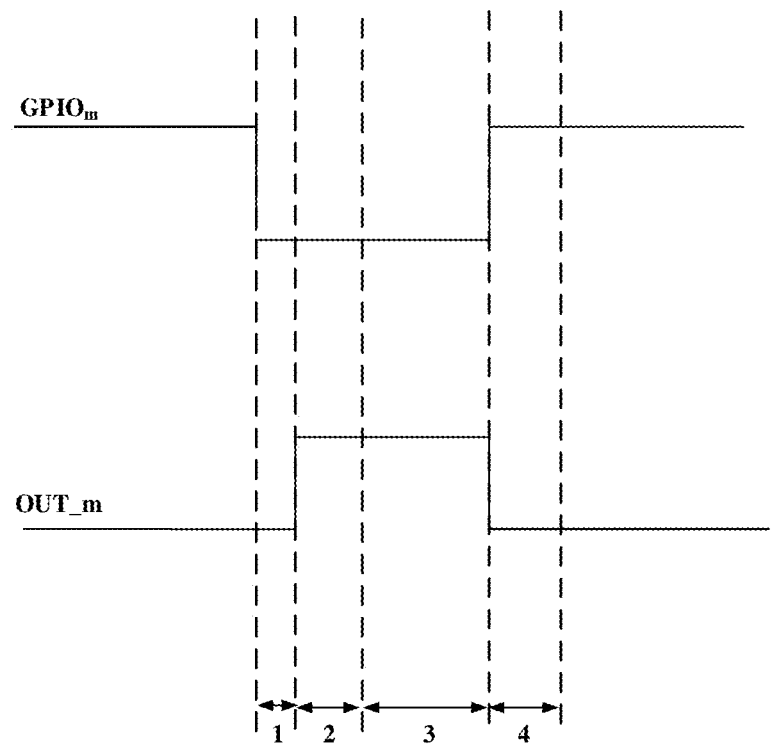
FIG. 7A is a timing diagram of signals of the light-valve driving circuit illustrated in FIG. 6B in operation.
Figure 7B:
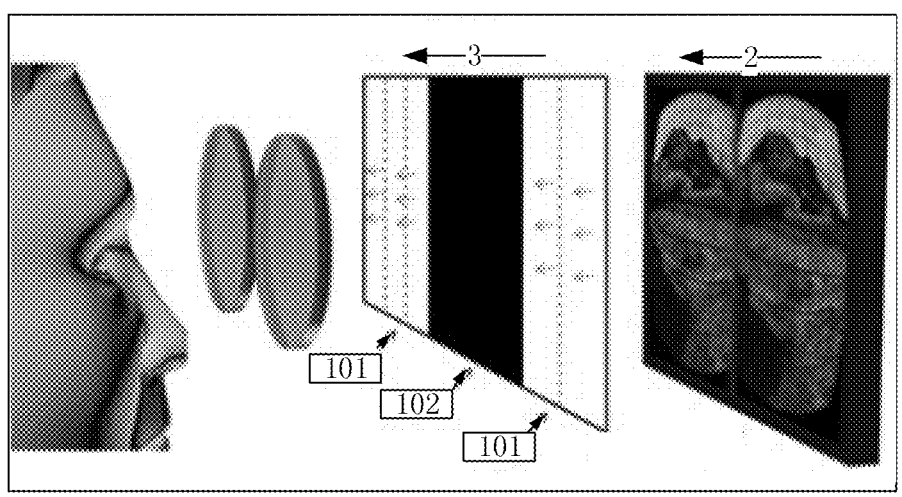
FIG. 7B is a schematic diagram of a working principle of a display device.

As illustrated in FIG. 7A, in the third phase 3, the (m)th display sub-region starts scanning, and in this phase, the corresponding (m)th sub light valve should be in the light-shielding state (i.e., the black state illustrated in FIG. 7B). Therefore, the light-valve driving circuit applies the light-valve driving voltage to the second transparent electrode 24 of the (m)th sub light valve in this phase. Because there is a response time when the liquid crystal in the light valve array changes from the light-transmitting state to the light-shielding state, it needs to apply the light-valve driving voltage to the driving electrode (for example, the second transparent electrode 24 illustrated in FIG. 3) of the (m)th sub light valve in advance. Therefore, in the second phase prior to the scanning of the display array, the light-valve driving voltage is applied to the second transparent electrode 24 of the (m)th sub light valve. Further, because the light-valve driving circuit needs a certain time to output the light-valve driving voltage, it needs to apply the switch control signal to the switch-control signal terminal GPIO of the light-valve driving circuit 400 in advance. Therefore, in the first phase 1 in FIG. 7A, the switch control signal is applied to the switch-control signal terminal GPIO of the light-valve driving circuit 400 in advance, thereby allowing the light-valve driving circuit to output the light-valve driving voltage in the second phase 2.

In the first phase 1, a low level signal is input to the switch-control signal terminal GPIO of the light-valve driving circuit 400, and the low level signal allows the first transistor T1 to be turned on, so that the control node N is connected to the second voltage terminal GND. Therefore, the level of the control node N is pulled down to a low level. Therefore, under control of the low level of the control node N, the second transistor T2 is turned off, so that the output terminal OUT of the light-valve driving circuit 400 is connected to the third voltage terminal VDD through the second pull-up resistor R2, thereby allowing the output terminal OUT to output the high level provided by the third voltage terminal VDD. Because the light-valve driving circuit 400 has a transmission delay, in the first phase 1, the potential of the output terminal OUT of the light-valve driving circuit 400 is gradually increased from a low level to a high level. Because the time maintained by the first phase 1 is the time of the transmission delay in the light-valve driving circuit 400, subsequent to entering the second phase 2 from the first phase 1, the level of the light-valve driving voltage outputted by the output terminal OUT of the light-valve driving circuit 400 is changed from the low level to the high level.

For example, in the present disclosure, the time of the transmission delay of the light-valve driving circuit is about 1 millisecond (ms), so when the light-valve driving voltage is applied to the (m)th sub light valve, the switch control signal is applied to the switch-control signal terminal GPIO of the (m)th light-valve driving circuit 400 in advance by 1 ms. It should be noted that because the time of the transmission delay of the different light-valve driving circuits may be different, the advance time is related to the specific light-valve driving circuit, which is not limited by the embodiments of the present disclosure.

In the second phase 2, when the light valve array changes from the light-transmitting state to the light-shielding state, the deflection of the liquid crystal has a response time, so prior to the scanning of the (m)th display sub-region, the light-valve driving voltage is applied to the driving electrode of the (m)th sub light valve in advance, thereby allowing the (m)th sub light valve to enter the light-shielding state. Therefore, in this phase, the control device 30 still inputs the low-level signal to the switch-control signal terminal GPIO of the light-valve driving circuit 400, and therefore, the output terminal OUT outputs a high level. The output terminal OUT outputs the high level to the driving electrode of the (m)th sub light valve to drive the liquid crystal layer in the (m)th sub light valve to deflect, so that the (m)th sub light valve changes from the light-transmitting state to the light-shielding state in the second phase 2.

For example, the second phase 2 is a phase in which the (m)th sub light valve is switched from the light-transmitting state to the light-shielding state, and the switch time is referred to as a one-sided response time. For example, the one-sided response time is the time required for a brightness of an image to change from one gray level to another gray level. For example, the one-sided response time may be a time required for the brightness of the image to change from a high gray level to a low gray level, or may be a time required to change from the low gray level to the high gray level, and for example, the one-sided response time is half of the response time. For example, in the present disclosure, the response time of the display array 10 is about 3 ms, so the one-sided response time is about 1.5 ms. Therefore, in the present disclosure, it needs to apply the light-valve driving voltage to the (m)th sub light valve in advance by about 1.5 ms, thereby allowing the (m)th sub light valve to switch from the light-transmitting state to the light-shielding state completely after 1.5 ms. It should be noted that the predetermined time is related to the material adopted in the light valve array, and the size thereof is determined according to specific situations. The embodiments of the present disclosure do not limit this.

The third phase 3 corresponds to the response phase of the (m)th display sub-region. In this phase, the (m)th display sub-region is scanned to allow the (m)th display sub-region to enter the response phase and to allow the (m)th sub light valve to maintain in the light-shielding state. When the (m)th display sub-region is scanned, because the liquid crystal material in the display sub-region has a response time, the blurred image phenomenon occurs. Therefore, the time that the third phase 3 needs to be maintained is the response time of the (m)th display sub-region. For example, the (m)th display sub-region includes p rows of sub-pixels, and in the present disclosure, for example, each display sub-region includes 60 rows of sub-pixels. Therefore, the process of scanning the (m)th display sub-region is a process of scanning p rows of sub-pixels and writing the data voltage. Therefore, when all the p rows of sub-pixels end the scanning and response phase, the light-valve driving voltage is turned off to apply, so that the (m)th sub light valve is switched from the light-shielding state to the light-transmitting state.

In the third phase 3, the switch-control signal terminal GPIO of the light-valve driving circuit 400 inputs a low-level signal, so that the output terminal OUT of the light-valve driving circuit 400 still outputs the high-level signal. The output terminal OUT continues to output the high level to the driving electrode of the (m)th sub light valve to drive the liquid crystal layer in the (m)th sub light valve to deflect, so that the (m)th sub light valve continues to maintain the light-shielding state during the response phase of the display array. For example, in the present disclosure, the response time of the (m)th display sub-region is about 3 ms, and the scanning time of the (m)th display sub-region is about 0.5 ms, so that the time which allows the (m)th sub light valve to maintain in the light-shielding state is 3.5 ms.

In the fourth phase 4, when all the sub-pixels in the (m)th display sub-region enter the display phase from the response phase, the light-valve driving voltage provided to the (m)th sub light valve is changed to a low level, thereby allowing the (m)th sub light valve to switch from the light-shielding state to the light-transmitting state. When the driving electrode controls the (m) the sub light valve to switch from the light-shielding state to the light-transmitting state, the deflection of the liquid crystal in the (m)th sub light valve needs a certain time, and therefore, the duration of this phase is the one-sided response time of the (m)th sub light valve.

In the fourth phase 4, the switch-control signal terminal GPIO of the light-valve driving circuit 400 inputs a high-level signal to allow the first transistor T1 to be turned off, so that the control node N is connected to the first voltage terminal VCC through the first pull-up resistor R1. Therefore, the control node N changes to a high level. Under control of the high level of the control node N, the second transistor T2 is turned on, so that the output terminal OUT is connected to the second voltage terminal GND, and the output terminal OUT outputs a low level, thereby allowing the light-valve driving voltage applied to the (m)th sub light valve to be at the low level. For example, in the present disclosure, the one-sided response time of the (m)th sub light valve is 1.5 ms, so after the driving voltage is turned off for 1.5 ms, the (m)th sub light valve enters the light-transmitting state from the light-shielding state, and the user can see the image displayed by the display array 10.

Figure 8:
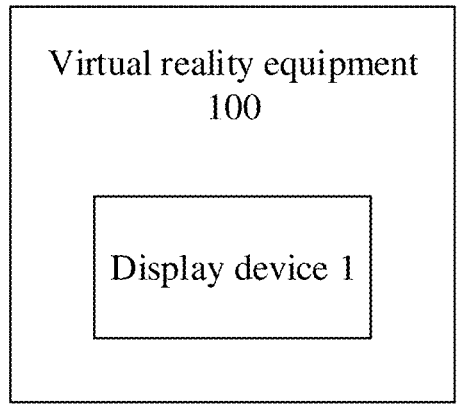
FIG. 8 is a schematic diagram of a virtual reality equipment provided by an embodiment of the present disclosure.

At least one embodiment of the present disclosure further provides a virtual reality equipment 100, and the virtual reality equipment 100 is, for example, a headset virtual reality helmet. For example, as illustrated in FIG. 8, the virtual reality equipment 100 includes any one of the display devices 1 provided by the embodiments of the present disclosure, and for example, includes the display device 1 illustrated in FIG. 1 or FIG. 4.

The embodiments of the present disclosure further provide a driving method of a display device, and the driving method can be used to drive any one of the display devices 1 provided by the embodiments of the present disclosure. The display device 1 includes a display array and a light valve array. The display array includes rows of sub-pixels. The light valve array includes a plurality of sub light valves, each of the plurality of sub light valves corresponds to at least one row of sub-pixels, and the light valve array is located on a light-emitting side of the display array. The driving method includes: allowing the sub light valve to be in a light-shielding state in a case where any sub-pixel in the at least one row of sub-pixels corresponding to the sub light valve is in a response phase of a display operation.

For example, the driving method provided by the embodiments of the present disclosure further includes: allowing a sub light valve to be in a light-transmitting state in a case where each sub-pixel in the at least one row of sub-pixels corresponding to the sub light valve is in a display phase of the display operation.

It should be noted that the response phase, the display phase, and the corresponding manner of the light valve array and the display array can be with reference to the corresponding description in the embodiments of the display device described above, and details will not be described herein again.

Figure 9:
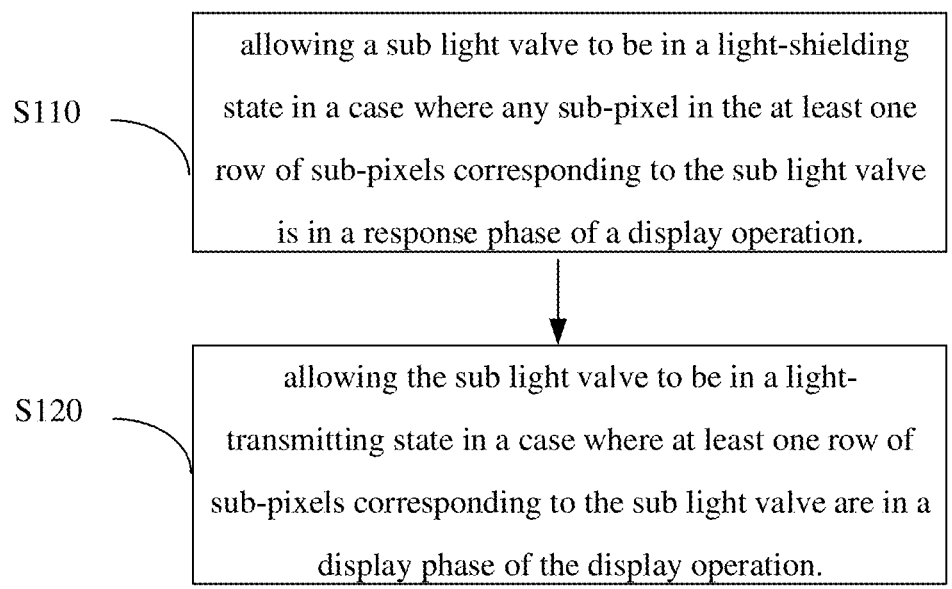
FIG. 9 is a schematic flow diagram of a driving method of a display device provided by an embodiment of the present disclosure.

FIG. 9 is a schematic flow diagram of a driving method of a display device provided by an embodiment of the present disclosure. For example, as illustrated in FIG. 9, the driving method of the display device 1 includes a step S110 and a step S120.

The step S110: allowing a sub light valve to be in a light-shielding state in a case where any sub-pixel in the at least one row of sub-pixels corresponding to the sub light valve is in a response phase of a display operation.

For example, in a case where the plurality of rows of sub-pixels in the display array 10 progressively or interlaced enter the response phase along a scanning direction, the plurality of sub light valves in the light valve array 20 sequentially enter the light-shielding state along the scanning direction.

The step S120: allowing the sub light valve to be in a light-transmitting state in a case where at least one row of sub-pixels corresponding to the sub light valve are in a display phase of the display operation (for example, in a case where all the sub-pixels in the at least one row of sub-pixels corresponding to the sub light valve are in a display phase).

For example, in a case where the rows of sub-pixels in the display array 10 sequentially enter the display phase from the response phase along the scanning direction, the plurality of sub light valves in the light valve array 20 sequentially change from the light-shielding state to the light-transmitting state along the scanning direction.

For example, in a driving method of a display device provided by an embodiment of the present disclosure, in a case where the rows of sub-pixels in the display array progressively enter the response phase along a scanning direction, the plurality of sub light valves in the light valve array sequentially enter the light-shielding state along the scanning direction; and in a case where the plurality of rows of sub-pixels in the display array sequentially enter the display phase from the response phase along the scanning direction, the plurality of sub light valves in the light valve array sequentially change from the light-shielding state to the light-transmitting state along the scanning direction.

Figure 10:
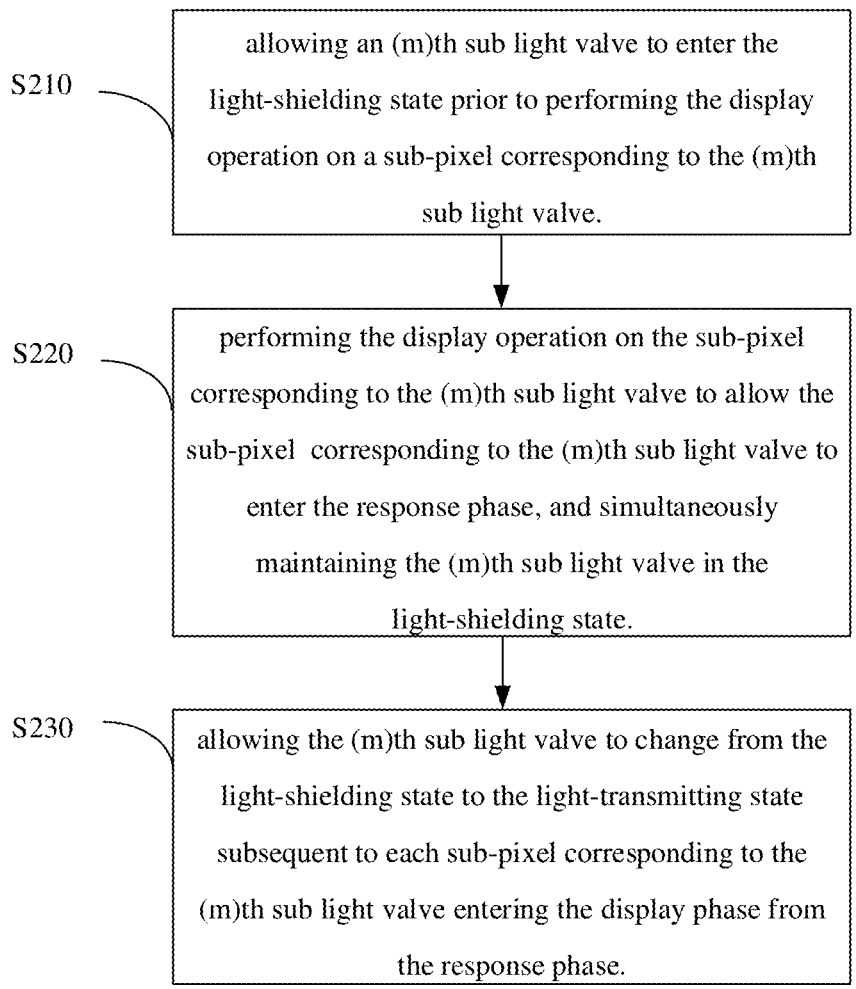
FIG. 10 is a schematic flow diagram of another driving method of a display device provided by an embodiment of the present disclosure.

In more detail, as illustrated in FIG. 10, the driving method of the display device 1 includes steps S210 to S230.

The step S210: allowing an (m)th sub light valve to enter the light-shielding state prior to performing the display operation on a sub-pixel (i.e., the sub-pixel in the (m)th display sub-region) corresponding to the (m)th sub light valve.

For example, allowing the (m)th sub light valve to switch from the light-transmitting state to the light-shielding state in a predetermined time prior to performing the display operation (e.g., performing progressively scanning) on the sub-pixel in the (m)th display sub-region, and the predetermined time is a one-sided response time of the sub light valve. For example, a light-valve driving voltage (for example, at a high level) is applied to the (m)th sub light valve to allow the (m)th sub light valve to switch from the light-transmitting state to the light-shielding state.

For example, the driving method provided by the embodiments of the present disclosure further includes obtaining and storing a length of the predetermined time in advance. For example, in a case where the control device 30 includes a memory, the length of the predetermined time can be stored in the memory. For example, the predetermined time can be obtained by experiment according to the liquid crystal material adopted.

The step S220: performing the display operation (e.g., performing progressively scanning) on the sub-pixel (i.e., the sub-pixel in the (m)th display sub-region) corresponding to the (m)th sub light valve to allow the sub-pixel (i.e., the sub-pixel in the (m)th display sub-region) corresponding to the (m)th sub light valve to enter the response phase, and simultaneously maintaining the (m)th sub light valve in the light-shielding state.

For example, the time of maintaining the (m)th sub light valve in the light-shielding state is a sum of the response time of the sub-pixel and the scanning time of the (m)th display sub-region.

The step S230: allowing the (m)th sub light valve to change from the light-shielding state to the light-transmitting state subsequent to each sub-pixel (i.e., the sub-pixel in the (m)th display sub-region) corresponding to the (m)th sub light valve entering the display phase from the response phase.

For example, in a case where the sub-pixel in the (m)th display sub-region enters the display phase from the response phase, the light-valve driving voltage applied to the (m)th sub light valve changes to a low level (for example, zero) to allow the (m)th sub light valve to enter the light-transmitting state. For example, the time from when the light-valve driving voltage at the low level is applied to when the (m)th sub light valve enters the light-transmitting state is the one-sided response time of the light valve array 20.

For example, the driving method provided by the embodiments of the present disclosure further includes: applying a light-valve driving voltage to the sub light valve to allow the sub light valve to switch between the light-transmitting state and the light-shielding state.

For example, the light-valve driving voltage includes a first light-valve driving voltage and a second light-valve driving voltage, and the first light-valve driving voltage is greater than the second light-valve driving voltage. Applying the light-valve driving voltage to the sub light valve to allow the sub light valve to switch between the light-transmitting state and the light-shielding state includes: applying the first light-valve driving voltage to the sub light valve to allow the sub light valve to switch to the light-shielding state, and applying the second light-valve driving voltage to the sub light valve to allow the sub light valve to switch to the light-transmitting state.

It should be noted that in the embodiments of the present disclosure, the light-valve driving voltage at a high level is referred to as the first light-valve driving voltage, and for example, the first light-valve driving voltage is 5.8V-8V; and the light-valve driving voltage at a low level is referred to as the second light-valve driving voltage, and for example, the second light-valve driving voltage is 0V. The embodiments of the present disclosure include, but are not limited thereto, and the values of the first light-valve driving voltage and the second light-valve driving voltage may be determined according to the specific situation of the light valve array.

For example, the light-valve driving voltage is applied to each of the remaining (N−1) sub light valves other than the (m)th sub light valve. For example, the time interval between applying the light-valve driving voltage to two adjacent sub light valves is one-Nth of the refresh time of each frame. For example, in the present disclosure, the frame rate of the display array is 60 Hz, and the refresh frequency of each frame is about 16 ms. For example, the present disclosure includes 32 sub light valves, so that the time interval between applying the light-valve driving voltage to two adjacent sub light valves is 0.5 ms. For example, after the light-valve driving voltage is applied to the (m)th sub light valve for 0.5 ms, the light-valve driving voltage is applied to the (m+1)th sub light valve. It should be noted that the time interval between applying the light-valve driving voltage to two adjacent sub light valves is determined according to specific situations, and the embodiments of the present disclosure do not limit this.

For example, the driving method further includes applying a switch control signal to each of the remaining (N−1) light-valve driving circuits other than the (m)th light-valve driving circuit. For example, the time interval between applying the switch control signal to two adjacent light-valve driving circuits is the same as the time interval between applying the light-valve driving voltage to two adjacent sub light valves, and details will not be described herein again.

The technical effects of the driving method of the display device provided by the embodiments of the present disclosure can be with reference to the corresponding description of the display device 1 in the above embodiments, and details will not be described herein again.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto, and the protection scope of the present disclosure should be based on the protection scope of the claims.

What is claimed is:

1. A driving method of a display device, wherein the display device comprises a display array and a light valve array, the display array comprises rows of sub-pixels, the light valve array comprises a plurality of sub light valves, a respective one sub light valve of the plurality of sub light valves corresponds to at least one row of sub-pixels, and the light valve array is on a light-emitting side of the display array;
  the driving method comprises:
    any sub-pixel in the at least one row of sub-pixels being in a response phase of a display operation, and the respective one sub light valve being in a light-shielding state;
  the driving method further comprises:
    each sub-pixel in the at least one row of sub-pixels being in a display phase of the display operation, and the respective one sub light valve being in a light-transmitting state;
  the driving method further comprises:
    an (m)th sub light valve of the light valve array entering the light-shielding state prior to sub-pixels corresponding to the (m)th sub light valve performing the display operation,
    the sub-pixels corresponding to the (m)th sub light valve performing the display operation to allow the sub-pixels corresponding to the (m)th sub light valve to enter the response phase, and simultaneously the (m)th sub light valve being maintained in the light-shielding state, and
    after each of the sub-pixels corresponding to the (m)th sub light valve entering the display phase from the response phase, the (m)th sub light valve being changed from the light-shielding state to the light-transmitting state;
  wherein the (m)th sub light valve of the light valve array entering the light-shielding state prior to the sub-pixel corresponding to the (m)th sub light valve performing the display operation comprises:
    the (m)th sub light valve switching from the light-transmitting state to the light-shielding state in a predetermined time prior to the sub-pixels corresponding to the (m)th sub light valve performing the display operation, wherein the predetermined time is a one-sided response time of the respective one sub light valve, and
  the driving method further comprises: obtaining and storing a length of the predetermined time.

2. The driving method according to claim 1,
  wherein the rows of sub-pixels in the display array progressively enter the response phase along a scanning direction, the plurality of sub light valves of the light valve array sequentially enter the light-shielding state along the scanning direction; and
  the rows of sub-pixels in the display array sequentially enter the display phase from the response phase along the scanning direction, the plurality of sub light valves of the light valve array sequentially change from the light-shielding state to the light-transmitting state along the scanning direction.

3. The driving method according to claim 2, further comprising:
  an (m)th sub light valve of the light valve array entering the light-shielding state prior to sub-pixels corresponding to the (m)th sub light valve performing the display operation;

the sub-pixels corresponding to the (m)th sub light valve performing the display operation to allow the sub-pixels corresponding to the (m)th sub light valve to enter the response phase, and simultaneously the (m)th sub light valve being maintained in the light-shielding state; and after each of the sub-pixels corresponding to the (m)th sub light valve entering the display phase from the response phase, the (m)th sub light valve being changed from the light-shielding state to the light-transmitting state.

4. The driving method according to claim 1, further comprising:

the respective one sub light valve being applied with a light-valve driving voltage to allow the respective one sub light valve to switch between the light-transmitting state and the light-shielding state.

5. The driving method according to claim 4, wherein the light-valve driving voltage comprises a first light-valve driving voltage and a second light-valve driving voltage, and the first light-valve driving voltage is greater than the second light-valve driving voltage; and the respective one sub light valve being applied with a light-valve driving voltage to allow the respective one sub light valve to switch between the light-transmitting state and the light-shielding state comprises:

the respective one sub light valve being applied with the first light-valve driving voltage to allow the respective one sub light valve to switch to the light-shielding state, and the respective one sub light valve being applied with the second light-valve driving voltage to allow the respective one sub light valve to switch to the light-transmitting state.

6. The driving method according to claim 1, further comprising:

the respective one sub light valve being applied with a light-valve driving voltage to allow the respective one sub light valve to switch between the light-transmitting state and the light-shielding state.

7. A display device, comprising a display array, a light valve array, and a control device;

wherein the display array comprises rows of sub-pixels, the light valve array comprises a plurality of sub light valves, a respective one sub light valve of the plurality of sub light valves corresponds to at least one row of sub-pixels, and the light valve array is on a light-emitting side of the display array; and the control device is coupled to the light valve array, and the control device is configured to control a state of the light valve array, so as to allow the respective one sub light valve to be in a light-shielding state in a case where any sub-pixel in the at least one row of sub-pixels corresponding to the respective one sub light valve is in a response phase of a display operation, and is configured to allow the respective one sub light valve to be in a light-transmitting state in a case where each sub-pixel in the at least one row of sub-pixels corresponding to the respective one sub light valve is in a display phase of the display operation;

the control device is configured to allowing an (m)th sub light valve of the light valve array to enter the light-shielding state prior to performing the display operation on sub-pixels corresponding to the (m)th sub light valve, is configured to performing the display operation on the sub-pixels corresponding to the (m)th sub light valve to allow the sub-pixels corresponding to the (m)th sub light valve to enter the response phase, and simultaneously maintaining the (m)th sub light valve in the light-shielding state, and is configured to allowing the (m)th sub light valve to change from the light-shielding state to the light-transmitting state subsequent to each of the sub-pixels corresponding to the (m)th sub light valve entering the display phase from the response phase, wherein the (m)th sub light valve of the light valve array entering the light-shielding state prior to the sub-pixel corresponding to the (m)th sub light valve performing the display operation comprises:

the (m)th sub light valve switching from the light-transmitting state to the light-shielding state in a predetermined time prior to the sub-pixels corresponding to the (m)th sub light valve performing the display operation, wherein the predetermined time is a one-sided response time of the respective one sub light valve; and the control device is configured to obtain and store a length of the predetermined time.

8. The display device according to claim 7, further comprising a plurality of light-valve driving circuits;

wherein the plurality of light-valve driving circuits are respectively coupled to the plurality of sub light valves, and the plurality of light-valve driving circuits are configured to receive switch control signals output by the control device, and are further configured to output light-valve driving voltages to drive the plurality of sub light valves respectively.

9. The display device according claim 8, wherein a respective one light-valve driving circuit of the plurality of light-valve driving circuits comprises an input sub-circuit and an output sub-circuit;

the input sub-circuit is connected to the control device to receive the switch control signal, and is configured to control a level of a control node in response to the switch control signal; and the output sub-circuit is connected to the input sub-circuit and the respective one sub light valve, and is configured to output the light-valve driving voltage to the respective one sub light valve under control of the level of the control node.

10. The display device according to claim 9, wherein the input sub-circuit comprises a first pull-up resistor and a first transistor;

a first terminal of the first pull-up resistor is configured to be connected to a first voltage terminal to receive a first voltage signal, and a second terminal of the first pull-up resistor is configured to be connected to the control node; and a gate electrode of the first transistor is configured to be connected to a switch-control signal terminal to receive the switch control signal, a first electrode of the first transistor is configured to be connected to a second voltage terminal, and a second electrode of the first transistor is configured to be connected to the control node.

11. The display device according to claim 9, wherein the output sub-circuit comprises a second pull-up resistor and a second transistor;

a first terminal of the second pull-up resistor is configured to be connected to a third voltage terminal to receive a third voltage signal, a second terminal of the second pull-up resistor is configured to be connected to an output terminal, and the output terminal is configured to output the light-valve driving voltage; and a gate electrode of the second transistor is connected to the control node, a first electrode of the second transistor is connected to a second voltage terminal, and a second electrode of the second transistor is connected to the output terminal.

12. A virtual reality equipment, comprising the display device according to claim 9.

13. The display device according to claim 8, further comprising a power supply circuit and a voltage boosting circuit,
wherein the power supply circuit is configured to provide a display driving voltage to the display array, and
the voltage boosting circuit is coupled to the power supply circuit and is configured to provide the plurality of light-valve driving circuits with a third voltage signal obtained by boosting the display driving voltage.

14. The display device according to claim 8, wherein the display array comprises a display driving circuit, and
the display driving circuit and the plurality of light-valve driving circuits are integrated on a same circuit board.

15. The display device according to claim 7, wherein the display array is a liquid crystal display array, and the light valve array comprises a liquid crystal light-valve array.

16. A virtual reality equipment, comprising the display device according to claim 7.

* * * * *